United States Patent Office 3,598,839
Patented Aug. 10, 1971

3,598,839
PHENYLBENZOTHIOPHENE COMPOUNDS
James S. Kaltenbronn, Ann Arbor, Mich., assignor to Parke, Davis & Company, Detroit, Mich.
No Drawing. Filed June 30, 1969, Ser. No. 837,917
Int. Cl. C07d 63/22; A61k 27/00
U.S. Cl. 260—330.5
7 Claims

ABSTRACT OF THE DISCLOSURE

Novel phenylbenzo[b]thiophenes (I) having pharmacological activity are provided by reduction of the corresponding acetic acids, acetonitriles, acetamides or N-acylethylamines and by N-alkylation of the corresponding primary and secondary amines

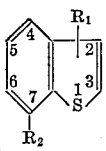

I where one of $R_1$ and $R_2$ is

—$CH(R_3)CH_2OH$, —$CH(_3)CH_2NH_2$

—$CH(R_3)CH_2NH$(lower alkyl or

—$CH(R_3)CH_2N$(lower alkyl)$_2$ and the other is phenyl, fluorophenyl or chlorophenyl, $R_1$ being attached at position 3 or 4 and $R_3$ is hydrogen or lower alkyl.

The compounds have anti-inflammatory properties and are useful agents in dosage form for treating inflammation.

SUMMARY AND DETAILED DESCRIPTION

This invention relates to new phenylbenzo[b]thiophene compounds. More particularly, the invention relates to new phenylbenzo[b]thiophene alkanols and alkylamines of the formula

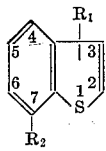

I and to methods for their production; where one of $R_1$ and $R_2$ represents phenyl, fluorophenyl or chlorophenyl and the other represents

—$CH(R_3)CH_2OH$, —$CH(R_3)CH_2NH_2$

—$CH(R_3)CH_2NH$ (lower alkyl)

and

—$CH(R_3)CH_2N$ (lower alkyl)$_2$ $R_1$ being attached at position 3 or 4; and $R_3$ represents hydrogen or lower alkyl. The lower alkyl groups of the compounds of Formula I are those containing not more than four carbon atoms and are preferably methyl or ethyl.

According to the invention, phenylbenzo[b]thiophene compounds of Formula I, where one of $R_1$ and $R_2$ represents phenyl, fluorophenyl or chlorophenyl and the other represents —$CH(R_3)CH_2OH$, are produced by reacting a compound of the formula

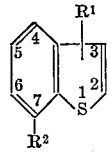

II with a reducing agent; where one of $R^1$ and $R^2$ represents phenyl, fluorophenyl or chlorophenyl and the other represents —$CH(R_3)COOR'$, $R^1$ being attached at position 3 or 4, R' represents hydrogen, a salt-forming cation, or a lower alkyl radical of fewer than four carbon atoms and $R_3$ has the significance specified above. The preferred method of carrying out the reduction is by reacting the carboxylic acid, salt, or ester with a complex metal hydride followed by or accompanied by hydrolysis of the product. Some examples of suitable complex metal hydrides are lithium aluminum hydride, lithium aluminum hydride-aluminum chloride, aluminum hydride-aluminum chloride, and sodium borohydride-aluminum chloride. In the case where a lower alkyl ester is the starting material, it is also satisfactory to carry out the reduction with sodium borohydride or to use a non-hydride reducing agent such as sodium in ethanol. The preferred reducing agent is lithium aluminum hydride followed by hydrolysis of the product. Preferred solvents for use with most of the complex metal hydrides named above are ethereal solvents such as diethyl ether, tetrahydrofuran, 1,2-dimethoxyethane, and diethylene glycol dimethyl ether. However, in the case of sodium borohydride, preferred solvents are water, dioxane, lower alkanols such as ethanol, and mixtures thereof. The required ratio of reactants depends on the particular starting materials used. For example, reduction with lithium aluminum hydride requires three-quarters of a mole of lithium aluminum hydride for each mole of carboxylic acid or one-half mole of lithium aluminum hydride for each mole of carboxylic acid ester. However, these calculated ratios are not normally employed as it is preferred to use a relatively large excess of the lithium aluminum hydride or other reducing agent. Thus, it is customary to use 2 moles of lithium aluminum hydride to reduce 1 mole of a carboxylic acid or up to 10 moles of sodium borohydride to reduce 1 mole of a carboxylic acid ester. The time and temperature of the reaction are not particularly critical and likewise are dependent on the specific reactants employed. In general, the reaction is carried out at a temperature between 0° and 120° C., with lithium aluminum hydride reductions preferably carried out at about 35–65° C. and sodium borohydride reductions preferably carried out at about 75° C. The usual reaction time with lithiium aluminum hydride is from 1 to 20 hours, optimally about 3 hours; and with sodium borohydride about 17 to 30 hours, optimally about 22 hours. Following reaction with a complex metal hydride in a non-aqueous solvent, the mixture is hydrolyzed with water or other aqueous medium and the product isolated. In other cases the product can be isolated directly.

Starting materials required for use in the foregoing process can be prepared by a variety of methods. For example, various ethyl 7-phenylbenzo[b]thiophene-4-acetates can be prepared by the following series of reactions. A substituted benzoyl chloride having the formula

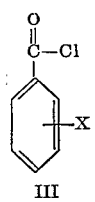

III is reacted with thiophene in the presence of stannic chloride to give a 2-benzoylthiophene having the formula

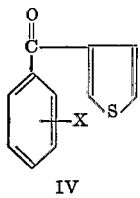

IV

The 2-benzoylthiophene intermediate is next reacted with zinc and ethyl bromoacetate, and the resulting ethyl 3-phenyl-3-(2-thienyl)acrylate is catalytically hydrogenated to give an ethyl 3-phenyl-3-(2-thienyl)propionate having the formula

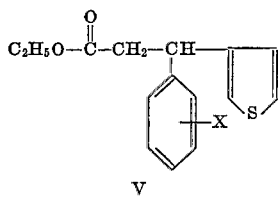

V

This ethyl 3-phenyl-3-(2-thienyl)propionate intermediate is then reduced by reaction with lithium aluminum hydride and the reaction product hydrolyzed to give a 3-phenyl-3-(2-thienyl)propan-1-ol having the formula

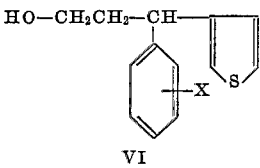

VI which is in turn reacted with phosphorus tribromide to give a 3-phenyl-3-(2-thienyl)propyl bromide having the formula

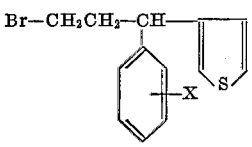

VII

This bromide intermediate is next reacted with sodium cyanide in aqueous acetone-ethanol, and the 4-phenyl-4-(2-thienyl)butyronitrile product having the formula

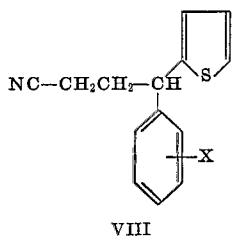

VIII is hydrolyzed by reaction with aqueous potassium hydroxide to give a 4-phenyl-4-(2-thienyl)butyric acid having the formula

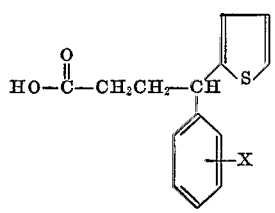

IX

This butyric acid intermediate is then cyclized by reaction with trifluoroacetic acid anhydride in trifluoroacetic acid, and the 7-phenyl-6,7-dihydrobenzo[b]thiophen-4(5H)-one product having the formula

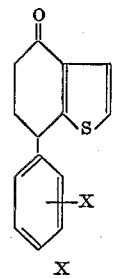

X is reacted with zinc and an ethyl bromoacetate compound having the formula

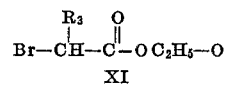

XI to give an ethyl 7-phenyl-6,7-dihydrobenzo[b]thiophene-4-acetate having the formula

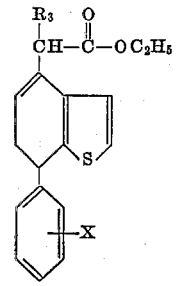

XII which is finally dehydrogenated by reaction with sulfur at about 230° C. to give one of the desired ethyl 7-phenylbenzo[b]thiophene-4-acetate starting materials having the formula

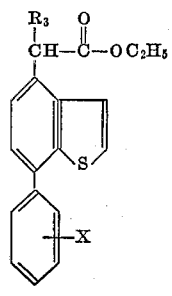

XIII

In Formulas III to XIII, $R_3$ has the same meaning as previously given and X is a hydrogen, fluorine or chlorine atom.

Also according to the invention, phenylbenzo[b]thiophene compounds of Formula I where one of $R_1$ and $R_2$ represents phenyl, fluorophenyl or chlorophenyl and the other represents —CH($R_3$)CH$_2$NH$_2$ are produced by reducing a compound having the formula

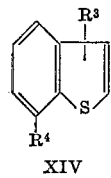

XIV where one of $R^3$ and $R^4$ is phenyl, fluorophenyl or chlorophenyl and the other is —CH($R_3$)CN or

—CH($R_3$)CONH$_2$ $R^3$ being attached at position 3 or 4 and $R_3$ has the significance specified above.

The reduction may be accomplished by employing catalytic, chemical, or electrolytic means. The reduction is accomplished catalytically by employing gaseous hydrogen and a hydrogenation catalyst in an unreactive solvent. Catalysts that may be used include Raney cobalt, and the noble metal catalysts, platinum, platinum oxide, palladium, and palladium oxide, which may optionally be supported on an inert carrier, such as charcoal. The catalyst reduction employing Raney cobalt is carried out in the presence of a small amount of ammonia or tertiary amine, such as triethylamine, in order to suppress formation of any secondary amine product. When one of the noble metal catalysts is employed, the reduction is best accomplished in the presence of an alkali metal acetate and acetic anhydride. In such a case, the initial product is an N-acetylated amine compound, which is subsequently hydrolyzed to give the desired free amine product. Suitable unreactive solvents that may be used include aromatic hydrocarbons, such as benzene and toluene; ethers, such as dioxane and 1,2-dimethoxyethane; and tertiary amides, such as N,N-dimethylformamide; as well as mixtures of these. The temperature of the catalytic reduction reaction is not critical and may be varied from room temperature to about 150° C. A temperature in the range, 100–150° C., is preferred, however, for rapid reduction. The reduction is best accomplished by employing hydrogen at a pressure of 1000 to 2500 lbs./in.², although pressures somewhat outside this range may also be employed. The duration of the reaction will vary, depending on the catalyst, temperature and hydrogen pressure employed. Normally the reaction is allowed to proceed until the required amount (2 molecular equivalents) of hydrogen has been absorbed. For the catalytic reduction of nitrile compounds, the preferred catalyst is Raney cobalt.

Chemical reducing agents that may be employed are the complex metal hydrides, such as lithium aluminum hydride, lithium aluminum hydride-aluminum chloride, sodium borohydride-aluminum chloride, sodium trimethoxyborohydride, and aluminum hydride-aluminum chloride. The reduction employing one of these complex metal hydrides is carried out in an anhydrous, unreactive, non-hydroxylic organic solvent. Preferred solvents are the ethers, diethyl ether, tetrahydrofuran, 1,2-dimethoxyethane, and diethylene glycol dimethyl ether. The chemical reduction is best carried out at the reflux temperature of the reaction mixture for a period that may vary from about 2 hours to 18 hours and longer. While equivalent quantities of reactants may be used, it is preferable to employ the reducing agent in moderate excess. Following initial reaction with the complex metal hydride, the reaction mixture is hydrolyzed with an aqueous medium such as water, dilute aqueous inorganic acids or bases and other media containing water. While in ordinary practice a considerable excess of the aqueous medium is added, at least four moles of water should be present for each mole of lithium aluminum hydride to insure complete hydrolysis. Reduction by means of a complex metal hydride, preferably lithium aluminum hydride, is the preferred method for the reduction of carbamoyl compounds.

Starting materials required for use in the foregoing reduction process can be prepared by a variety of methods. For example, various 3-phenylbenzo[b]thiophene-7-acetonitrile starting materials can be prepared by the following series of reactions. o-Thiocresol is reacted with a phenacyl bromide having the formula

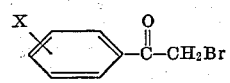

XV and the 2-[(o-tolyl-thio]acetophenone product having the formula

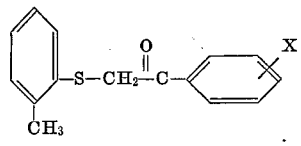

XVI is cyclized by reaction with phosphorus pentoxide in phosphoric acid to give a 3-phenyl-7-methylbenzo[b]thiophene having the formula

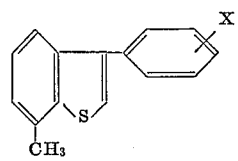

XVII

The 3-phenyl-7-methylbenzo[b]thiophene intermediate is next reacted with N-bromosuccinimide in the presence of benzoyl peroxide in carbon tetrachloride to give a 3-phenylbenzo[b]thiophene-7-methylbromide having the formula

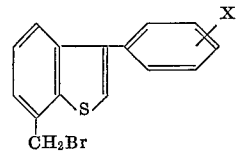

XVIII which is finally reacted with sodium cyanide in aqueous acetone to give the desired 3-phenylbenzo[b]thiophene-7-acetonitrile starting material having the formula

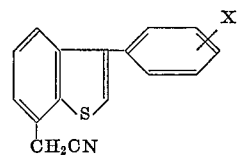

XIX

In the foregoing Formulas XV to XIX, the substituent X has the same significance specified above.

Further, by way of example, α-alkyl-3-phenylbenzo[b]thiophene-7-acetonitrile starting material for use in the reduction process described are prepared by reacting a 3 - phenylbenzo[b]thiophene - 7-acetonitrile of Formula XIX first with sodium hydride and then with an alkyl halide having the formula $R_3$—Hal    XX to give the desired starting material having the formula

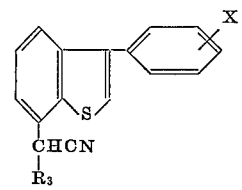

XXI where $R_3$ and X are as defined previously and Hal represents chlorine, bromine, or iodine.

The preparation of specific examples of the starting materials described above and others required for the practice of the invention is described in detail hereinafter.

Also in accordance with the invention, phenylbenzo[b]thiophene compounds of Formula I where one of $R_1$ and $R_2$ represents phenyl, fluorophenyl or chlorophenyl and the other represents —CH(R$_3$)CH$_2$A are produced by reducing a compound having the formula

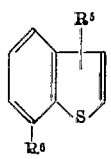

where one of R$^5$ and R$^6$ is phenyl, fluorophenyl or chlorophenyl and the other represents one of the groups having the formulas —CH(R$_3$)CH$_2$NHCOZ
—CH(R$_3$)CH$_2$N(lower alkyl)COZ
—CH(R$_3$)CONH(lower alkyl) and
—CH(R$_3$)CON(lower alkyl)$_2$ where R$^5$ is attached at position 3 or 4, Z represents hydrogen or lower alkyl, A is amino, lower alkylamino or di(lower alkyl)-amino, and R$_3$ and lower alkyl have the above-specified significance. The reduction may be carried out employing catalytic, chemical, or electrolytic means.

The reduction is accomplished catalytically by employing gaseous hydrogen and a hydrogenation catalyst, optionally in an unreactive solvent medium. Suitable catalysts for this purpose include Raney cobalt and copper chromite. The reduction is best carried out in the presence of ammonia or a tertiary amine, such as, triethylamine. Although a solvent is not strictly required suitable solvents that may be used, if desired, include various ethers, such as dioxane and 1,2-dimethoxyethane, and various hydrocarbons, such as isooctane and Decalin. For rapid and complete reduction, a temperature in the range, 200–350° C., is preferred. Temperatures somewhat outside this range may also be employed, however. The reduction is best accomplished by using hydrogen at a pressure of 250 to 400 atmospheres (about 3500 to 6000 lbs./in.²), although pressures somewhat outside this range may also be employed. The duration of the reaction will vary, depending on the catalyst, temperature, and hydrogen pressure employed. Normally, the reaction is allowed to proceed until the required amount (2 molecular equivalents) of hydrogen has been absorbed.

The reduction may be accomplished chemically by employing various complex metal hydrides, such as lithium aluminum hydride, lithium aluminum hydride-aluminum chloride, sodium borohydride-aluminum chloride, and aluminum hydride-aluminum chloride, and diborane in an anhydrous unreactive, non-hydroxylic solvent medium, which is preferably an ether, such as diethyl ether, dioxane, tetrahydrofuran, 1,2-dimethoxyethane, and diethylene glycol dimethyl ether. For reduction of the primary and secondary amides, the preferred reducing agent is lithium aluminum hydride-aluminum chloride; for reduction of the tertiary amides, the preferred agent is lithium aluminum hydride. The sodium borohydride-aluminum chloride reducing agent gives satisfactory results only when used for the reduction of the tertiary amides. The temperature and duration of the chemical reduction reaction are not critical and will vary, depending on the solvent and reducing agent employed. In the usual case, the reaction is best carried out at the reflux temperature of the reaction mixture for a period that may vary from about one hour to 24 hours and longer. While equivalent quantities of reactants may be used, it is preferable to employ the reducing agent in moderate excess. Following initial reaction with the reducing agent, the reaction mixture is hydrolyzed with an aqueous medium, which may be water, dilute aqueous inorganic acids or bases or other media containing water. A considerable excess of the aqueous medium is employed to insure that hydrolysis is complete.

The amide compounds used as starting material in the foregoing process can be prepared according to various methods as illustrated in greater detail hereinafter.

Further in accordance with the invention, phenylbenzo[b]thiophene compounds of Formula I where one of R$_1$ and R$_2$ represents phenyl, fluorophenyl or chlorophenyl and the other represents —CH(R$_3$)CH$_2$N(lower alkyl)$_2$ are produced by reacting an amine compound having the formula

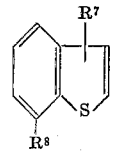

with an alkylating agent; where one of R$^7$ and R$^8$ is phenyl, fluorophenyl or chlorophenyl and the other represents —CH(R$_3$)CH$_2$NH$_2$ or —CH(R$_3$)CH$_2$NH(lower alkyl, R$^7$ being attached at position 3 or 4 and R$_3$ and lower alkyl have the same meaning previously given. Suitable alkylating agents for use in this reaction are lower alkyl halides, such as methyl iodide and ethyl bromide; lower alkyl esters of inorganic acids and organic sulfonic acids, such as dimethyl sulfate, diethyl sulfate, methyl benzenesulfonate, and methyl p-toluenesulfonate; and trialkyloxonium fluoborates, such as triethyloxonium fluoborate. The reaction is preferably carried out in the presence of a base; suitable bases for this purpose are alkali metal carbonates and alkali metal bicarbonates. The ratio of reactants will depend on the starting material that is employed and the product that is desired. When the starting material is a primary amine a secondary amine product is obtained by using slightly more than one equivalent of alkylating agent and base, whereas a tertiary amine product is obtained by using somewhat more than two equivalents of alkylating agent and base. When the starting material is a secondary amine, a tertiary amine product is obtained by using slightly more than one equivalent of alkylating agent and base. Depending upon the particular alkylating agent and base chosen, a variety of solvents and reaction conditions may be used. Some examples of suitable solvents are aromatic hydrocarbons, ethers, lower alkanols, lower aliphatic ketones, and other non-reactive solvents, such as dimethyl sulfoxide, N,N-dimethylformamide, and acetonitrile. With dimethyl sulfate or diethyl sulfate as the alkylating agent, water or an aqueous lower alkanol may advantageously be employed as solvents. The temperature and duration of the reaction are not critical and may be varied over a wide range, depending upon the particular alkylating agent and solvent that are used. It is most convenient to carry out the reaction at the reflux temperature of the reaction mixture for a period that may vary from 30 minutes to several days.

For the preparation of amine compounds by methylation, an alternative alkylation method to the one described above comprises reacting an amine compound of Formula XXIII with an aqueous mixture of formaldehyde and formic acid. Both the formaldehyde and formic acid are used in substantial excess, with the excess formic acid serving as solvent for the reaction. Additional solvent is neither required nor desirable. The temperature of the reaction may be varied between about 70° C. and 125° C., with a temperature in the range, 90–110° C. being preferred. The duration of the reaction is not critical and may be varied from about 3 to about 16 hours. At the preferred temperature, the reaction is usually complete in about 4 to 8 hours.

The amine free base compounds of the invention form acid addition salts with a variety of inorganic and organic acids. Pharmaceutically-acceptable salts are formed by the reaction of the free base with an acid such as hydrochloric, hydrobromic, hydriodic, sulfuric, acetic, benzoic, citric, tartaric, maleic, and related acids. The salt formation is suitably carried out by reacting the selected base with the selected acid in an unreactive solvent. The acid addition salts can be converted to the free bases by reaction with a base such as sodium carbonate or potassium carbonate. In the applications of this invention, the compounds are preferably employed in the form of acid addition salts.

The compounds of the invention are new chemical compounds that are useful as pharmacological agents, especially as anti-inflammatory agents. As such, they are of value in mitigating the symptoms associated with inflammatory conditions, as well as in preventing or suppressing the occurrence of inflammation. This anti-inflammatory activity is demonstrable and quantitatively measurable in a test designed to measure the ability of a test compound to delay the normal appearance of an erythema in animals exposed to ultraviolet radiation under standardized conditions. The test procedure that is used has been described in Archives Internationales de Pharmacodynamie et de Therapie, vol. 116, pages 261–292, 1958. This test has been found to be a reliable indicator of anti-inflammatory activity, as demonstrated, for example, for the known clinically useful agents, aminopyrine, antipyrine, and aspirin.

The results obtained for preferred compounds of the present invention, when tested by the standard test procedure, are shown in the following table. In the table, anti-inflammatory activity is given in terms of the minimum dose that was found to be effective in delaying the appearance of an erythema.

| Compound: | Minimum effective dose, mg./kg. |
|---|---|
| β - methyl - 7 - phenylbenzo[b]thiophene-4-ethanol | 0.8 |
| 4-phenylbenzo[b]thiophene-7-ethanol | 0.2 |
| 3 - phenylbenzo[b]thiophene - 7 - ethylamine, monohydrochloride | 0.2 |
| β-Methyl - 3-phenylbenzo[b]thiophene-7-ethylamine, monohydrochloride | 0.8 |
| N,N-dimethyl - 3 - phenylbenzo[b]thiophene-7-ethylamine, monohydrochloride | 0.2 |
| 7-phenylbenzo[b]thiophene-3-ethylamine, monohydrochloride | 0.8 |

The compounds of the invention are preferably administered by the oral route although parenteral administration can also be used. They can be combined with either a solid or liquid carrier or diluent and made available in varying amounts in such pharmaceutical forms as tablets, capsules, powders and aqueous and non-aqueous suspensions and solutions.

The invention is illustrated by the following examples.

Example 1

To a stirring suspension of 1.1 g. of lithium aluminum hydride in 30 ml. of ether, is added dropwise a solution of 4.0 g. of α-methyl-7-phenylbenzo[b]thiophene-4-acetic acid in 70 ml. of tetrahydrofuran. After refluxing three hours, the mixture is decomposed by the successive addition of ethanol and water. The organic phase is separated, washed with saturated sodium chloride, dried over anhydrous sodium sulfate, and concentrated in vacuo. The product is β-methyl - 7 - phenylbenzo[b]thiophene-4-ethanol; M.P. 80.5–81.5° C. after recrystallization.

By substituting 4-(o-chlorophenyl)benz[b]thiophene-7-acetic acid (4.2 g.) for the acetic acid starting material just mentioned, the product obtained by this procedure is 4-(o-chlorophenyl)benzo[b]thiophene-7-ethanol.

Example 2

Using a suspension of 1.4 g. of lithium aluminum hydride in 15 ml. of ether and 15 ml. of tetrahydrofuran, a solution of 5.0 g. of 3-phenylbenzo[b]thiophene-7-acetic acid in 30 ml. of tetrahydrofuran is reduced in the manner of Example 1. The product obtained upon concentration, 3-phenylbenzo[b]thiophene-7-ethanol, is purified by distilling and collecting as the fraction boiling at 184–188° C. (0.6–0.7 mm.); M.P. 40.5–42.5° C. from cyclohexane-hexane.

Example 3

(a) Following the procedure of Example 1, a solution of 3.1 g. of 4-phenylbenzo[b]thiophene-7-acetic acid in 70 ml. of tetrahydrofuran is reduced with 0.87 g. of lithium aluminum hydride suspended in 30 ml. of ether. The product obtained following work up and concentration is 4 - phenylbenzo[b]thiophene-7-ethanol; M.P. 84–86° C. after recrystallization from benzene-hexane.

(b) By the same procedure using a suspension of 1.3 g. of lithium aluminum hydride in 30 ml. of ether, a solution of 4.7 g. of 3-(p-fluorophenyl)benzo[b]thiophene-7-acetic acid in 70 ml. of tetrahydrofuran is reduced, hydrolyzed, concentrated and distilled. The product, 3-(p-fluorophenyl)benzo[b]thiophene-7-ethanol, is obtained as the fraction boiling between 180–210° C. (0.2–0.3 mm.); M.P. 68–70° C. from hexane.

Example 4

A mixture of 6.3 g. of 3-phenylbenzo[b]thiophene-7-acetonitrile, 100 ml. of toluene, 2.0 g. of Raney cobalt and 2 ml. of triethylamine is hydrogenated at 125° C. and 1900 p.s.i., until the calculated amount of hydrogen is absorbed. After filtration, the mixture is concentrated and its residue dissolved in ether for treatment by anhydrous hydrogen chloride. The salt formed is collected by filtration, recrystallized from methanol-ethyl acetate, and then suspended in ether for treatment by 5% aqueous sodium hydroxide. The ether layer is washed with water, dried over anhydrous sodium sulfate, and then concentrated. Distillation of the residue yields the free base, 3-phenylbenzo[b]thiophene-7-ethylamine; B.P. 165–170° (0.15–0.20 mm.). The free base is dissolved in ether, treated with excess gaseous hydrogen chloride, and the resulting monohydrochloride salt of the free base is collected; M.P. 230–265° C. with decomposition after recrystallization from methanol-ethyl acetate.

The hydrobromide salt is obtained by dissolving the free base in ether, treating the ethereal solution with a slight excess of dry hydrogen bromide, concentrating the resulting mixture, and isolating the precipitated salt.

The acetate salt is obtained by dissolving the free base in ether, adding to the solution a slight excess of glacial acetic acid, concentrating the resulting mixture, and isolating the precipitated salt.

Example 5

(a) A suspension of 0.91 g. of lithium aluminum hydride and 70 ml. of ether is carefully treated with a solution of 1.1 g. of aluminum chloride and 14 ml. of toluene. After stirring at room temperature for one hour, the resulting mixture is treated dropwise with a solution of 3.3 g. of α-methyl-7-phenylbenzo[b]thiophene-4-acetamide in 140 ml. of tetrahydrofuran. This mixture is refluxed overnight and then decomposed by addition of 30 ml. of 8% aqueous sodium hydroxide. The organic phase is separated, washed by saturated sodium chloride solution, dried over anhydrous sodium sulfate, and then concentrated in vacuo. The residual free base product, β-methyl-7-phenylbenzo[b]thiophene - 4 - ethylamine, is dissolved in ether and treated with gaseous hydrogen chloride to form the monohydrochloride salt, D.P. 295–300° C. after recrystallization from methanol-ethyl acetate.

By the same procedure, starting with α-methyl-3-phenylbenzo[b]thiophene-7-acetamide (2.6 g.) in tetrahydrofuran (70 ml.) using a mixture of lithium aluminum hydride (0.7 g.) suspended in ether (70 ml.) and aluminum chloride (0.8 g.) in toluene (14 ml.), the product is β-methyl - 3 - phenylbenzo[b]thiophene - 7 - ethylamine, monohydrochloride, D.P. 256–259° C. after recrystallization from methanol-ethyl acetate. Also, by the same procedure but starting with 7-(o-fluorophenyl)benzo[b]thiophene-4-acetamide (3.4 g.), the product is 7-(o-fluorophenyl)benzo[b]thiophene - 4 - ethylamine, hydrochloride.

(b) The starting material for (a) is prepared by the following procedure: A solution of 6.0 g. of α-methyl-7-phenylbenzo[b]thiophene-4-acetic acid in 100 ml. of benzene is carefully treated with 40 ml. of thionyl chloride. The resulting solution is refluxed overnight and then concentrated in vacuo. The residual product, α-methyl-7-phenylbenzo[b]thiophene-4-acetic acid chloride, is dissolved in benzene, reconcentrated, suspended in 200 ml. of ammonium hydroxide, and stirred at room temperature overnight. The product, α-methyl-7-phenylbenzo[b]thiophene-4-acetamide, is collected by filtration, washed with water, dried, and recrystallized from benzene-ethyl acetate; M.P. 173° C.

Using the same procedure, by way of the corresponding acetic acids and acid chlorides, the following acetamides are prepared:

7-phenylbenzo[b]thiophene-3-acetamide
α - Methyl - 3 - phenylbenzo[b]thiophene - 7-acetamide; M.P. 155–158° C. (benzene-ethyl acetate)
7-(o-fluorophenyl)benzo[b]thiophene-4-acetamide Example 6

A mixture of 1.4 g. of lithium aluminum hydride in 75 ml. of ether and 1.7 g. of aluminum chloride in 14 ml. of toluene, prepared according to the procedure of Example 5(a), is treated dropwise with 4.8 g. of 7-phenylbenzo[b]thiophene-3-acetamide in 80 ml. of tetrahydrofuran. The resulting mixture is allowed to stir overnight at room temperature before workup in the manner of Example 5(a) to yield 7-phenylbenzo[b]thiophene-3-ethylamine, monohydrochloride, D.P. 260–263° C. after recrystallization from methanol-ethyl acetate.

By the same procedure, the product N-methyl-3-phenylbenzo[b]thiophene - 7 - ethylamine, monohydrochloride (D.P. 214–216° C. from methanol-ethylacetate) is obtained starting from N - methyl - 3 - phenylbenzo[b]thiophene-7-acetamide (5.2 g.); M.P. 122.5–124° C., benzene-hexane prepared by stirring the acid chloride (6.0 g.) overnight at room temperature with 40% aqueous methylamine (200 ml.).

Example 7

(a) A solution of 4.6 g. of N,N-dimethyl-3-phenylbenzo[b]thiophene-7-acetamide in 80 ml. of tetrahydrofuran is cautiously added to a stirring suspension of 0.5 g. of lithium aluminum hydride in 60 ml. of ether. The resulting mixture is refluxed two hours and allowed to stand at room temperature overnight. The reaction mixture is decomposed with aqueous sodium hydroxide, and the organic phase is separated, washed with saturated sodium chloride solution and dried over anhydrous sodium sulfate. After filtration, the solution is concentrated to provide the free base product, N,N-dimethyl-3-phenylbenzo[b]thiophene-7-ethylamine. The monohydrochloride salt is obtained by treating an ethereal solution of the free base with excess gaseous hydrogen chloride; D.P. 230–233° after recrystallization from methanol-ethyl acetate.

(b) The starting material can be prepared as follows: A mixture of 6.0 g. of 3-phenylbenzo[b]thiophene-7-acetic acid chloride and 200 ml. of 40% dimethylamine is stirred at room temperature overnight. The product, N,N-dimethyl-3-phenylbenzo[b]thiophene-7-acetamide, is collected by filtration, washed with water, and dried; M.P. 108–109.5° C. after recrystallization from benzene-hexane.

By a similar procedure, starting from 4-(m-chlorophenyl)benzo[b]thiophene - 7 - acetic acid chloride, the product is 4 - (m - chlorophenyl)-N,N-dimethylbenzo[b]thiophene-7-acetamide.

Example 8

A solution of 3.9 g. of 4-(m-chlorophenyl) - N,N - dimethylbenzo[b]thiophene-7-acetamide in 70 ml. of tetrahydrofuran is reduced by a mixture of 1.1 g. of lithium aluminum hydride in 70 ml. of ether and 1.2 g. of aluminum chloride in 14 ml. of toluene according to the procedure of Example 5. The product is 4-(m-chlorophenyl)-N,N - dimethylbenzo[b]thiophene - 7-ethylamine, monohydrochloride; M.P. 237–238° C. after recrystallization from methanol-ethyl acetate.

Example 9

A mixture of 29.0 g. of 3-phenylbenzo[b]thiophene-7-ethylamine, 31.2 g. of methyl iodide, 40.0 g. of potassium carbonate, and 150 ml. of acetonitrile is refluxed five hours and then cooled for dilution by 500 ml. of water. Ether extracts of the aqueous mixture are washed with water, dried, and concentrated in vacuo. The resulting free base product is N,N - dimethyl - 3-phenylbenzo[b]thiophene-7-ethylamine. The free base is dissolved in ether and the solution treated with excess hydrogen chloride to yield the monohydrochloride salt, D.P. 230–233° after recrystallization from methanol-ethyl acetate.

STARTING MATERIALS

The various starting materials and intermediates employed in the foregoing examples can be prepared by the methods described in the following.

(A) 2-benzoylthiophenes (1) 2-(o-fluorobenzoyl)thiophene.—To a stirred mixture consisting of 81.7 g. of thiophene, 154 g. of o-fluorobenzoyl chloride, and one liter of benzene is added dropwise 253 g. of stannic chloride while the temperature is maintained below 10° C. The resulting mixture is stirred below 10° C. for one hour and at room temperature for two hours and is then decomposed with dilute hydrochloric acid. The organic phase is separated, washed with water, with saturated aqueous sodium bicarbonate, and with water again until neutral, dried, and concentrated. The residue is distilled to give 2-(o-fluorobenzoyl)thiophene, B.P. 108–115° C./0.7 mm. Hg.

(B) Ethyl 3-phenyl-2-(2-thienyl)acrylates (1) Ethyl 3 - (o-fluorophenyl)-3-(2-thienyl)acrylate.— To a mixture consisting of 104.5 g. of 2-(o-fluorobenzoyl)thiophene, 101.5 g. of ethyl bromoacetate, 40 g. of zinc, and 600 ml. of benzene is added a crystal of iodine, and the resulting mixture is heated under reflux for 90 minutes. It is then cooled and decomposed with dilute hydrochloric acid. The organic phase is separated, washed with water, with saturated aqueous sodium bicarbonate, with water again until neutral, dried, and concentrated. The residue is distilled to give ethyl 3-(o-fluorophenyl)-3-(2-thienyl) acrylate, B.P. 143–145° C./0.7–1.1 mm. Hg.

(C) Ethyl 3-phenyl-3-(2-thienyl)propionates (1) Ethyl 3-phenyl-3-(2-thienyl)propionate.—A mixture consisting of 161 g. of ethyl 3-phenyl-3-(2-thienyl) acrylate, 13 g. of 20% palladium-on-charcoal, and one liter of methanol at 27° C. is treated with hydrogen at an initial pressure of 50 lbs./in.² until a sufficient quantity of hydrogen is absorbed to reduce the double bond. The mixture is then filtered, and the filtrate is distilled to give ethyl 3-phenyl-3-(2-thienyl)propionate, B.P. 117–130° C./ 0.2–0.3 mm. Hg.

(2) Ethyl 3-(o-fluorophenyl)-3-(2-thienyl)propionate, B.P. 112–115° C./0.1–0.2 mm. Hg; obtained by the method of (1) above from the catalytic hydrogenation of ethyl 3-(o-fluorophenyl)-3-(2-thienyl)acrylate.

(D) 3-phenyl-3-(2-thienyl)propan-1-ols (1) 3-phenyl-3-(2-thienyl)propan-1-ol.—A solution of 151.9 g. of ethyl 3-phenyl-3-(2-thienyl)propionate in 750 ml. of dry ether is added dropwise to a suspension of 22.2 g. of lithium aluminum hydride in 450 ml. of dry ether, and the resulting mixture is heated under reflux for 90 minutes. It is then cooled and decomposed by treatment with ethyl acetate and with water, and the organic phase is separated, washed with saturated aqueous sodium chloride, and dried. The dried solution is then distilled to give 3-phenyl-3-(2-thienyl)propan-1-ol, B.P. 119–165° C./0.6–0.7 mm. Hg.

(2) 3-(o-fluorophenyl)-3-(2-thienyl)propan-1-ol, B.P. 91–150° C./0.4–0.5 mm. Hg; obtained by the method of (1) above from the reaction of ethyl 3-(o-fluorophenyl)-3-(2-thienyl)propionate with lithium aluminum hydride.

(E) 3-phenyl-3-(2-thienyl)propyl bromides (1) 3-phenyl-3-(2-thienyl)propyl bromide.—A solution of 51 g. of phosphorus tribromide in 400 ml. of ether is added dropwise to a solution of 111.4 g. of 3-phenyl-3-(2-thienyl)propan-1-ol in 600 ml. of ether while the temperature is maintained at 0–10° C., and the resulting mixture is stirred overnight at room temperature. The gum that forms during this time is separated and discarded, and the solution is washed with water, with 5% sodium hydroxide, and with water again until neutral, and dried. The dried solution is then distilled to give 3-phenyl-3-(2-thienyl)propyl bromide, B.P. 132–138° C./0.4–0.5 mm. Hg.

(2) 3-(o-fluorophenyl)-3-(2 - thienyl)propyl bromide, B.P. 110–168° C./0.3–0.4 mm. Hg; obtained by the method of (1) above from the reaction of 3-(o-fluorophenyl)-3-(2-thienyl)propan-1-ol with phosphorus tribromide.

(F) 4-phenyl-4-(2-thienyl)butyronitriles (1) 4-phenyl-4-(2-thienyl)butyronitrile.—A solution of 18.8 g. of sodium cyanide in 100 ml. of water is added to a mixture consisting of 89.7 g. of 3-phenyl-3-(2-thienyl) propyl bromide, 400 ml. of ethanol, and 400 ml. of acetone, and the resulting mixture is heated under reflux for 20 hours. It is then concentrated to remove the solvent, and the residue is dissolved in ether. The ethereal solution is washed with water, dried and evaporated to give 4-phenyl-4-(2-thienyl)butyronitrile, suitable for use without further purification.

(2) 4-(o-fluorophenyl)-4-(2 - thienyl)butyronitrile, obtained as an oil that is suitable for use without further purification by the method of (1) above from the reaction of 3-(o-fluorophenyl)-3-(2-thienyl)propyl bromide with sodium cyanide.

(G) 4-phenyl-4-(2-thienyl)butyric acids (1) 4-phenyl-4-(2 - thienyl)butyric acid.—A mixture consisting of 72.5 g. of 4-phenyl-4-(2-thienyl)butyronitrile, 75 g. of potassium hydroxide, 400 ml. of water, and 750 ml. of ethanol is heated under reflux overnight, concentrated to remove most of the solvent, and the residue is treated with a mixture of water and ether. The aqueous phase is separated and acidified with dilute hydrochloric acid, and the 4-phenyl-4-(2-thienyl)butyric acid that precipitates is isolated and crystallized from benzene-hexane; M.P. 94–95° C.

(2) 4-(o-fluorophenyl)-4-(2-thienyl)butyric acid, M.P. 90–91° C., following crystallization from aqueous ethanol; obtained by the method of (1) above from the basic hydrolysis of 4-(o-fluorophenyl)-4-(2-thienyl)butyronitrile.

(H) Dihydrobenzo[b]thiophen-4(5H)-ones (1) 7-phenyl-6,7-dihydrobenzo[b]thiophen - 4 - (5H)-one.—To a solution of 52.8 g. of 4-phenyl-4-(2–thienyl) butyric acid in 400 ml. of trifluoroacetic acid is added dropwise 45.5 g. of trifluoroacetic acid anhydride, and the resulting mixture is stirred at room temperature for one hour. An additional 2 ml. of trifluoroacetic acid anhydride is added, and the mixture is stilled at room temperature overnight, heated under reflux for one hour, and concentrated. The residue is dissolved in ether, and the ethereal solution is washed with 2.5% aqueous sodium hydroxide and with water, dried, and concentrated to give a solid residue of 7-phenyl-6,7-dihyrobenzo[b]thiophen-4-(5H)-one; M.P. 65.5–68.5° C. following crystallization from hexane.

(2) 7-(o-fluorophenyl)-6,7 - dihydrobenzo[b]thiophen-4-(5H)-one, B.P. 140–175° C./0.4 mm. Hg; obtained from the reaction of 4-(o-fluorophenyl)-4-(2 - thienyl) butyric acid with trifluoroacetic acid anhydride in trifluoroacetic acid according to the method of (1) above.

(3) 7-methyl - 6,7 - dihydrobenzo[b]thiophen-4(5H)-one, B.P. 93–95° C./0.8–1.1 mm. Hg; obtained from the following series of reactions. Ethyl 3-(2-thienyl)crotonate is hydrogenated according to the procedure described in (C) (1) above to give ethyl 3-(2-thienyl)butyrate, B.P. 63–69° C./0.2–0.3 mm. Hg; the ethyl 3-(2-thienyl)butyrate is reduced by reaction with lithium aluminum hydride and subsequent hydrolysis of the reaction product according to the method of (D) (1) above to give 3-(2-thienyl) butan-1-ol, B.P. 70–83° C./0.2–0.3 mm. Hg; the 3-(2-thienyl)butan-1-ol is reacted with phosphorus tribromide according to the procedure of (E) (1) above to give 3-(2-thienyl)butyl bromide, B.P. 64–80° C./0.2–0.4 mm. Hg; this halide intermediate is next reacted with sodium cyanide in aqueous acetone-ethanol according to the procedure of (F) (1) above and the 4-(2-thienyl)valeronitrile product is subjected to basic hydrolysis according to the procedure described in (G) (1) above to give 4-(2-thienyl)valeric acid, which is finally reacted with trifluoroacetic acid anhydride in trifluoroacetic acid according to the procedure in (H) (1) above to give the desired 7-methyl-6,7-dihydrobenzo[b]thiophen-4(5H)-one.

(I) Phenyl-substituted dihydrobenzo[b]thiophenes (1) 4 - phenyl - 7 - methyl - 6,7 - dihydrobenzo[b] thiophene.—To a solution of phenyl magnesium bromide (prepared from 42.5 g. of bromobenzene, 6.5 g. of magnesium, and 200 ml. of ether) is added dropwise with stirring a solution of 39.3 g. of 7-methyl-6,7-dihydrobenzo[b]thiophen-4(5H)-one in 300 ml. of ether, and the resulting mixture is stirred at room temperature for 18 hours. The mixture is then hydrolyzed by treatment with dilute hydrochloric acid, and the organic phase is separated, washed with water, with saturated aqueous sodium bicarbonate, and with water again until neutral, dried, and evaporated to dryness. To the oily residue is added 100 ml. of acetic anhydride, and the resulting solution is heated under reflux for two hours, cooled, and poured into water. The aqueous mixture is made alkaline with 50% sodium hydroxide, and the alkaline mixture is extracted with ether. The combined ether extracts are washed with water until neutral, dried, and evaporated to dryness. To the residue is added 200 ml. of absolute ethanol, 16 g. of (carboxymethyl)trimethylammonium chloride hydrazide (Girard's Reagent T), and 16 ml. of acetic acid, and the resulting mixture is heated under reflux for one hour. Ethylene glycol (200 ml.) is then added, and the mixture is concentrated to remove the ethanol. The concentrated solution is extracted with ether, and the ether extracts are washed with water, with saturated aqueous sodium bicarbonate, and with water again until neutral, dried, and evaporated to dryness. The residual product is 7-methyl-4-phenyl-6,7-dihydrobenzo[b]thiophene; M.P. 87–93° C.

(2) Utilizing the foregoing general procedure, the following phenyl-substituted dihydrobenzo[b]thiophenes are obtained from the reaction of the appropriate reactants:

(a) 4 - (m - fluorophenyl) - 7 - methyl-6,7-dihydrobenzo[b]thiophene, M.P. 63.5–67° C.

(b) 4 - (o - chlorophenyl) - 7 - methyl - 6,7-dihydrobenzo[b]thiophene, obtained as an oil that is suitable for use without further purification.

(c) 4 - (m - chlorophenyl) - 7 - methyl - 6,7-dihydrobenzo[b]thiophene, obtained as an oil that is suitable for use without further purification.

(J) Phenylbenzo[b]thiophenes (1) 4 - phenyl - 7 - methylbenzo[b]thiophene.—A mixture of 44.2 g. of 7-methyl-4-phenyl-6,7-dihydrobenzo[b]thiophene and 6.56 g. of sulfur is heated at 222–

232° C. for 30 minutes, cooled, and dissolved in benzene. The benzene solution is poured onto a basic alumina chromatography column, and the column is eluted with benzene. The benzene eluates are evaporated, and the oily residue is distilled under reduced pressure. The main fraction distilling under reduced pressure is collected and the product which separates on standing, 4-phenyl-7-methylbenzo[b]thiophene, is purified by recrystallization from ethanol; M.P. 76–78° C.

(2) Utilizing the foregoing general procedure, the following phenylbenzo[b]thiophenes are obtained from the dehydrogenation of the appropriate phenyl-substituted dihydrobenzo[b]thiophenes:

(a) 4 - (m - fluorophenyl) - 7 - methylbenzo[b]thiophene, obtained as an oil that is suitable for use without further purification.

(b) 4 - (o - chlorophenyl) - 7 - methylbenzo[b]thiophene, obtained as an oil that is collected between 87 and 210° C. at 1.0–1.5 mm. Hg.

(c) 4 - (m - chlorophenyl) - 7 - methylbenzo[b]thiophene, obtained as an oil that is collected between 102 and 190° C. at 0.20–0.25 mm. Hg.

(3) 3 - phenyl - 7 - methylbenzo[b]thiophene.—To 100 ml. of phosphoric acid is added in portions 132 g. of phosphorus pentoxide, and after the resulting solution cools to 40° C., 12.1 g. of 2-[(o-tolyl)thio]acetophenone is added. The reaction mixture is heated at 60° C. for two hours, cooled, and poured into water. The aqueous mixture is extracted with ether, and the combined ether extracts are washed with water, with saturated aqueous sodium bicarbonate, and with water again until neutral, dried, and evaporated to dryness to give 3-phenyl-7-methylbenzo[b]thiophene, obtained as a yellow oil collected between 97 and 142° C. at 0.5–0.7 mm. Hg.

(4) 3 - (p - fluorophenyl) - 7 - methylbenzo[b]thiophene.—A mixture consisting of 14.3 g. of o-thiocresol, 25.0 g. of p-fluorophenacyl bromide, and 60 ml. of pyridine is heated under reflux for six hours, cooled and poured into 2 liters of ice-water. The aqueous mixture is acidified with dilute hydrochloric acid, and the solid 2-[(o-tolyl)thio]-p-fluoroacetophenone that precipitates is isolated, dried, and crystallized from benzene-hexane; M.P. 49–51° C. This intermediate is cyclized by reaction with phosphorus pentoxide in phosphoric acid according to the procedure in (3) above to give 3-(p-fluorophenyl)-7-methylbenzo[b]thiophene, M.P. 54.5–55.5° C., following crystallization from aqueous ethanol.

(5) 3 - (p - chlorophenyl) - 7 - methylbenzo[b]thiophene, M.P. 79–81.5° C., following crystallization from aqueous ethanol; obtained by the procedure described in (4) above by first reacting o-thiocresol with p-chlorophenacyl bromide to give 2-[(o-tolyl)thio]-p-chloroacetophenone, M.P. 56.5–58.5° C., following crystallization from benzene-hexane, and then cyclizing this intermediate by reaction with phosphorus pentoxide in phosphoric acid.

(K) (Bromomethyl)phenylbenzo[b]thiophenes (1) 4 - phenylbenzo[b]thiophene - 7-methylbromide.— To a solution of 10.0 g. of 7-methyl-4-phenylbenzo[b]thiophene in 100 ml. of carbon tetrachloride is added 7.95 g. of recrystallized N-bromosuccinimide and 100 mg. of dibenzoyl peroxide, and the resulting mixture is heated under reflux for five hours while it is irradiated with light from a flood lamp. It is then filtered, and the filtrate evaporated to dryness. The residue is triturated with hexane, and the hexane mixture is cooled in a Dry Ice-acetone bath to give as an oil 4-phenylbenzo[b]thiophene-7-methylbromide suitable for use without further purification.

(2) Utilizing the general procedure described in (1), with only minor variations in reaction conditions and isolation technique, the following (bromomethyl)phenylbenzo[b]thiophenes are obtained from the reaction of the appropriate phenylbenzo[b]thiophenes with N-bromosuccinimide. In each case the product is obtained as an oil suitable for use without further purification.

(a) 3-phenylbenzo[b]thiophene-7-methyl bromide
(b) 3-(p-fluorophenyl)benzo[b]thiophene-7-methyl bromide
(c) 3-(p-chlorophenyl)benzo[b]thiophene-7-methyl bromide
(d) 4-phenylbenzo[b]thiophene-7-methyl bromide
(e) 4-(m-fluorophenyl)benzo[b]thiophene-7-methyl bromide
(f) 4-(o-chlorophenyl)benzo[b]thiophene-7-methyl bromide
(g) 4-(m-chlorophenyl)benzo[b]thiophene-7-methyl bromide
(h) 7-phenylbenzo[b]thiophene-3-methyl bromide (L) Phenylbenzo[b]thiopheneacetonitriles (1) 3-phenylbenzo[b]thiophene - 7 - acetonitrile.—A mixture consisting of 153 g. of 3-phenylbenzo[b]thiophene-7-methyl bromide, 26.4 g. of soduim cyanide, 150 ml. of water, and 1500 ml. of acetone is stirred at room temperature overnight and then concentrated to remove the solvent. The residue is treated with ether, and the ethereal mixture is washed with water, dried, and evaporated to give a brown oily residue of 3-phenylbenzo[b]thiophene-7-acetonitrile, which is purified by chromatography on alumina and crystallization from ethanol; M.P. 107.5–110° C.

(2) Utilizing the general procedures described in (1) above, the following phenylbenzo[b]thiopheneacetonitries are obtained from the reaction of the appropriate (bromomethyl)phenylbenzo[b]thiophenes with sodium cyanide:

(a) 3 - (p-fluorophenyl)benzo[b]thiophene-7-acetonitrile
(b) 3-(p-chlorophenyl)benzo[b]thiophene-7-acetonitrile
(c) 4-phenylbenzo[b]thiophene-7-acetonitrile
(d) 4-(m-fluorophenyl)benzo[b]thiophene-7-acetonitrile
(e) 4-(o-chlorophenyl)benzo[b]thiophene-7-acetonitrile
(f) 4-(m-chlorophenyl)benzo[b]thiophene-7-acetonitrile
(g) 7-phenylbenzo[b]thiophene-3-acetonitrile (M) α-Alkyl-phenylbenzo[b]thiopheneacetonitriles (1) α-Methyl - 3 - phenylbenzo[b]thiophene-7-acetonitrile.—To a suspension of 1.6 g. of 53.4% sodium hydride in mineral oil dispersion in 15 ml. of dimethyl sulfoxide in a nitrogen atmosphere is added dropwise a solution of 8.0 g. of 3-phenylbenzo[b]thiophene-7-acetonitrile in 55 ml. of dimethylsulfoxide while the reaction temperature is maintained below 35° C. The resulting mixture is stirred at room temperature under nitrogen for five hours, 9.1 g. of methyl iodide is added while the temperature is kept below 25° C., and the reaction mixture is stirred under nitrogen at room temperature overnight. It is then decomposed by treatment with dilute acetic acid, and the acetic acid mixture is extracted with ether. The ether extracts are washed with water, with saturated aqueous sodium bicarbonate, and with water again, dried, and evaporated to dryness to give α-methyl-3-phenylbenzo[b]thiophene-7-acetonitrile, obtained as an oil that is suitable for use without further purification.

(2) α-Ethyl - 3 - phenylbenzo[b]thiophene - 7-acetonitrile, obtained as an oil that is suitable for use without further purification by the procedure of (1) above with the substitution of ethyl bromide for the methyl iodide.

(3) α-Butyl - 3 - phenylbenzo[b]thiophene-7-acetonitrile, obtained as an oil suitable for use without further purification by the procedure of (1) above with the substitution of n-butyl bromide for the methyl iodide.

(4) α-Methyl - 4 - phenylbenzo[b]thiophene-7-acetonitrile, obtained by the procedure of (1) above from the reaction of 4-phenylbenzo[b]thiophene-7-acetonitrile with sodium hydride and then with methyl iodide.

(5) α-Ethyl - 4 - phenylbenzo[b]thiophene-7-acetonitrile, obtained by the procedure of (1) above from the reaction of 4-phenylbenzo[b]thiophene-7-acetonitrile with sodium hydride and then with ethyl bromide.

(6) α-Methyl - 7 - phenylbenzo[b]thiophene-3-acetonitrile, obtained by the procedure of (1) above from the reaction of 7-phenylbenzo[b]thiophene-3-acetonitrile with sodium hydride and then with methyl iodide.

(N) Phenylbenzo[b]thiopheneacetic acid esters (1) Ethyl 7 - phenylbenzo[b]thiophene-3-acetate.—To a solution of 2.9 g. of sodium methoxide in 100 ml. of methanol is added 10.0 g. of 2-(biphenylyl)thiol. After stirring for ten minutes, there is further added a solution of 8.85 g. of ethyl 4-chloroacetoacetate in 20 ml. of methanol. The resulting mixture is heated under reflux for one hour, cooled, and poured into water. The aqueous mixture is extracted with ether, and the ether extracts are washed with saturated aqueous sodium chloride, dried, and evaporated to give ethyl 4-(2-biphenylylthio)acetoacetate as an oil that can be used without further purification.

Phosphorus pentoxide (132 g.) is added in portions to 100 ml. of phosphorus acid, and after the resulting solution cools to 40° C., 15.5 g. of ethyl 4-(2-biphenylthio)acetoacetate is added. The reaction is heated at 60° C. for two hours, cooled, and poured into water. The aqueous mixture is extracted with ether. The combined ether extracts are washed with water, with saturated aqueous sodium bicarbonate, and with water again until neutral, dried, and evaporated to dryness to give ethyl 7-phenylbenzo[b]thiophene-3-acetate as an oil that is suitable for use without further purification.

To a mixture consisting of 6.5 g. of 7-phenyl-6,7-dihydrobenzo[b]thiophen-4(5H)-one, 5.8 g. of ethyl bromoacetate, 2.8 g. of zinc, and 50 ml. of benzene is added a crystal of iodine, and the mixture is heated under reflux for two hours. An additional 2 g. of ethyl bromoacetate and 1 g. of zinc is then added, and the reaction mixture is heated under reflux for two hours more. The mixture is then filtered to remove unreacted zinc, and the filtrate is washed with dilute hydrochloric acid, with water, with saturated aqueous sodium bicarbonate, and with water again until neutral. It is then dried and evaporated. The residue is dissolved in 100 ml. of acetic anhydride, and the solution obtained is heated under reflux for one hour and evaporated. The residue is extracted into ether, and the ether extracts are washed with saturated aqueous sodium bicarbonate and with water until neutral, dried, and evaporated. The residue obtained in this manner is dissolved in 100 ml. of absolute ethanol. To the solution is added 4 g. of (carboxymethyl)trimethylammonium chloride hydrazide and 4 ml. of acetic acid, and the resulting mixture is heated under reflux for one hour. Ethylene glycol is added, and the mixture is concentrated to remove the ethanol. The concentrated solution is then extracted with ether, and the ether extracts are washed with water, with saturated aqueous sodium bicarbonate, and with water again until neutral, dried, and evaporated to give ethyl 7-phenyl-6,7-dihydrobenzo[b]-thiophene-4-acetate.

The foregoing intermediate (8.5 g.) is mixed with 1.0 g. of sulfur, and the mixture is heated at 226–230° C. for one hour to give ethyl 7-phenylbenzo[b]thiophene-4-acetate according to analogous dehydrogenation procedures described earlier.

(3) Ethyl α-methyl-7-phenylbenzo[b]thiophene-4-acetate; prepared according to the procedure described in (2) above by first reacting 7-phenyl-6,7-dihydrobenzo[b]thiophen-4(5H)-one with ethyl α-bromopropionate and zinc to give ethyl α-methyl-7-phenyl-6,7-dihydrobenzo[b]thiophene-4-acetate and then dehydrogenating this intermediate by reaction with sulfur.

(4) Ethyl α-propyl-7-phenylbenzo[b]thiophene-4-acetate; prepared as in (2) above from the reaction of 7-phenyl - 6,7 - dihydrobenzo[b]thiophen-4(5H)-one with ethyl α-bromovalerate and zinc to give ethyl α-propyl-7-phenyl-6,7-dihydrobenzo[b]thiophene-4-acetate and the subsequent dehydrogenation of this intermediate with sulfur.

(5) Ethyl 7-(o-fluorophenyl)benzo[b]thiophene-4-acetate; prepared as in (2) above from the reaction of 7-(o-fluorophenyl)-6,7-dihydrobenzo[b]thiophen - 4(5H)-one with ethyl bromoacetate and zinc to give ethyl 7-(o-fluorophenyl)-6,7 - dihydrobenzo[b]thiophene - 4-acetate and the subsequent dehydrogenation of this intermediate with sulfur.

(6) Ethyl α - methyl-7-(o-fluorophenyl)benzo[b]thiophene-4-acetate, isolated by distillation as an oil collected between 168 and 205° C. at 1.0–1.1 mm. Hg; obtained by the procedure of (2) above from the reaction of 7-(o-fluorophenyl)-6,7-dihydrobenzo[b]thiophen - 4(5H)-one with ethyl α-bromopropionate and zinc to give ethyl α-methyl - 7 - (o-fluorophenyl)-6,7-dihydrobenzo[b]thiophene-4-acetate and the subsequent dehydrogenation of this intermediate with sulfur.

(7) Ethyl α-ethyl - 7 - (o-fluorophenyl)benzo[b]thiophene-4-acetate, isolated by distillation as an oil collected between 175 and 220° C. at 1.0–1.2 mm. Hg; obtained by the procedure of (2) above from the reaction of 7-(o-fluorophenyl)-6,7-dihydrobenzo[b]thiophen - 4(5H)-one with ethyl α-bromobutyrate and zinc to give ethyl α-ethyl - 7 - (o-fluorophenyl)-6,7-dihydrobenzo[b]thiophene-4-acetate and the subsequent hydrolysis of this intermediate with sulfur.

(O) Phenylbenzo[b]thiopheneacetic acids (1) 7-phenylbenzo[b]thiophene - 3 - acetic acid.—A solution of 11.7 g. of potassium hydroxide in 50 ml. of water is added to a solution of 11.7 g. of ethyl 7-phenylbenzo[b]thiophene-3-acetate in 100 ml. of ethanol, and the resulting mixture is heated under reflux for one hour and then evaporated under reduced pressure. The residue is dissolved in water, and the aqueous solution is washed with ether and acidified with dilute hydrochloric acid. The solid 7-phenylbenzo[b]thiophene-3-acetic acid that precipitates is isolated and crystallized from benzene-hexane, M.P. 137–138° C.

(2) 7-phenylbenzo[b]thiophene-4-acetic acid.—A solution of 10 g. of potassium hydroxide in 25 ml. of water is added to a solution of 8.3 g. of ethyl 7-phenylbenzo[b]thiophene-4-acetate in 100 ml. of ethanol, and the resulting mixture is heated under reflux for two hours and then evaporated under reduced pressure. The residue is dissolved in water, and the aqueous solution is washed with ether and acidified with dilute hydrochloric acid. The acidified mixture is extracted with ether, and the ethereal solution is washed with water, dried, and evaporated to give a black solid residue of 7-phenylbenzo[b]thiophene-4-acetic acid, which is purified by chromatography on silica gel [benzene wash; 10% ether-in-benzene eluate] and crystallized from benzene-hexane; M.P. 128.5–129.5° C.

Utilizing the foregoing procedure with only minor variations, the following phenylbenzo[b]thiopheneacetic acid compounds are obtained from the basic hydrolysis of the ester compounds designated below:

(a) α-Methyl - 7 - phenylbenzo[b]thiophene-4-acetic acid, M.P. 159.5–161.5° C., following crystallization from aqueous ethanol; from the basic hydrolysis of ethyl α-methyl-7-phenylbenzo[b]thiophene-4-acetate.

(b) 7-phenyl - α - propylbenzo[b]thiophene-4-acetic acid, M.P. 129–131° C., following crystallization from aqueous ethanol; from the basic hydrolysis of ethyl 7-phenyl-α-propylbenzo[b]thiophene-4-acetate.

(c) 7-(o-fluorophenyl)benzo[b]thiophene - 4 - acetic acid, M.P. 125–126° C., following crystallization from benzene-hexane; from the basic hydrolysis of ethyl 7-(o-fluorophenyl)benzo[b]thiophene-4-acetate.

(d) α-Methyl-7-(o - fluorophenyl)benzo[b]thiophene-4-acetic acid, M.P. 116–117.5° C. (benzene-hexane);

from the basic hydrolysis of ethyl α-methyl-7-(o-fluorophenyl)benzo[b]thiophene-4-acetate.

(e) α-Ethyl - 7 - (o-fluorophenyl)benzo[b]thiophene-4-acetic acid, M.P. 138.5–139.5° C. (benzene-hexane); from the basic hydrolysis of ethyl α-ethyl-7-(o-fluorophenyl)benzo[b]thiophene-4-acetate.

(3) 3-phenylbenzo[b]thiophene-7-acetic acid.—A solution of 108 g. of potassium hydroxide in 300 ml. of water is added to a solution of 108 g. of 3-phenylbenzo[b]thiophene-7-acetonitrile in 2 liters of ethanol, and the resulting mixture is heated under reflux for 18 hours and then evaporated under pressure. The residue is treated with a mixture of water and ether, and the aqueous layer is separated, washed with ether, and acidified with dilute hydrochloric acid. The acidified mixture is then extracted with ether, and the ether extracts are washed with water until neutral and dried. The dried ethereal solution is evaporated, and the oily residue obtained is purified by chromatography on silica gel. The solid obtained from 10% ether-in-benzene eluates is 3-phenylbenzo[b]thiophene-7-acetic acid, M.P. 129–130° C., following crystallization from benzene.

Utilizing the foregoing procedure with only minor variations in operating conditions and in isolation technique, the following phenylbenzo[b]thiopheneacetic acid compounds are obtained from the basic hydrolysis of the nitrile compounds designated below:

(a) α-Methyl-3-phenylbenzo[b]thiophene-7-acetic acid, M.P. 162–164° C., following crystallization from benzene; from hydrolysis of α-methyl-3-phenylbenzo[b]thiophene-7-acetonitrile.

(b) α-Ethyl-3-phenylbenzo[b]thiophene-7-acetic acid, M.P. 155–157.5° C. (benzene); from reaction of 9.0 g. of α-ethyl-3-phenylbenzo[b]thiophene - 7 - acetonitrile in 250 ml. of ethanol with 9.0 g. of potassium hydroxide in 30 ml. of water at reflux for 2.5 days.

(c) α-Butyl-3-phenylbenzo[b]thiophene-7-acetic acid, M.P. 94.5–95.5° C. (benzene-hexane); from hydrolysis of α-butyl-3-phenylbenzo[b]thiophene-7-acetonitrile.

(d) 3-(p-fluorophenyl)benzo[b]thiophene-7-acetic acid, M.P. 152–153.5° C. (benzene-hexane); from hydrolysis of 3-(p-fluorophenyl)benzo[b]thiophene-7-acetonitrile.

(e) 3-(p-chlorophenyl)benzo[b]thiophene - 7 - acetic acid, M.P. 152–154° C. (benzene); from hydrolysis of 3-(p-chlorophenyl)benzo[b]thiophene-7-acetonitrile.

Utilizing a procedure analogous to that described in the foregoing examples, the following phenylbenzo[b]thiophene acetic acid compounds are obtained from the basic hydrolysis of the nitrile compounds designed below:

(a) 4-phenylbenzo[b]thiophene-7-acetic acid, M.P. 139.5–141.5° C. (benzene-hexane); from hydrolysis of 4-phenylbenzo[b]thiophene-7-acetonitrile.

(b) 4-(m-fluorophenyl)benzo[b]thiophene - 7 - acetic acid, M.P. 123–124.5° C.; from hydrolysis of 4-(m-fluorophenyl)benzo[b]thiophene-7-acetonitrile.

(c) 4 - (o - chlorophenyl)benzo[b]thiophene - 7 - acetic acid, M.P. 158–161° C., following chromatography on silica gel and crystallization from ethanol-water; from hydrolysis of 4 - (o - chlorophenyl)benzo[b]thiophene-7-acetonitrile.

(d) 4 - (m - chlorophenyl)benzo[b]thiophene-7-acetic acid, M.P. 131.5–133.5° C., following successive crystallizations from benzene-hexane and benzene; from hydrolysis of 4 - (m - chlorophenyl)benzo[b]thiophene-7-acetonitrile.

(e) α - Methyl - 4 - phenylbenzo[b]thiophene-7-acetic acid, M.P. 132–134.5° C., following two crystallizations from benzene-hexane; from hydrolysis of α-methyl-4-phenylbenzo[b]thiophene-7-acetonitrile.

(f) α-Ethyl-4-phenylbenzo[b]thiophene - 7 - acetic acid, M.P. 158–160° C., following chromatography on silica gel and crystallization from ethanol-water; from hydrolysis of α-ethyl-4-phenylbenzo[b]thiophene-7-acetonitrile.

I claim:

1. A member of the group consisting of phenylbenzo[b]thiophene alkanols and alkylamines having the formula

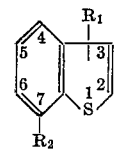

and pharmaceutically-acceptable acid addition salts of the alkylamines; where one of $R_1$ and $R_2$ is phenyl, fluorophenyl or chlorophenyl and the other of $R_1$ and $R_2$ is a member of the group consisting of —CH($R_3$)CH$_2$OH
—CH($R_3$)CH$_2$NH$_2$
—CH($R_3$)CH$_2$NH(lower alkyl) and
—CH($R_3$)CH$_2$N(lower alkyl)$_2$ $R_1$ being attached at position 3 or 4 and $R_3$ is a member of the group consisting of hydrogen and lower alkyl.

2. A compound according to claim 1 which is β-methyl-7-phenylbenzo[b]thiophene-4-ethanol.

3. A compound according to claim 1 which is 4-phenylbenzo[b]thiophene-7-ethanol.

4. A compound according to claim 1 which is 3-phenylbenzo[b]thiophene-7-ethylamine, monohydrochloride.

5. A compound according to claim 1 which is 7-phenylbenzo[b]thiophene-3-ethylamine, monohydrochloride.

6. A compound according to claim 1 which is N,N-dimethyl-3-phenylbenzo[b]thiophene-7-ethylamine, monohydrochloride.

7. A compound according to claim 1 which is β-methyl-3-phenylbenzo[b]thiophene - 7 - ethylamine, monohydrochloride.

References Cited
FOREIGN PATENTS 1,177,338    1/1970    Great Britain _____ 260—330.5

HENRY R. JILES, Primary Examiner

C. M. SHURKO, Assistant Examiner

U.S. Cl. X.R.

260—329R, 332.2A, 332.3C, 332.3P, 332.5, 481, 592; 424—275